United States Patent
Bahng et al.

(10) Patent No.: US 8,116,396 B2
(45) Date of Patent: Feb. 14, 2012

(54) METHOD FOR RE-ORDERING MULTIPLE LAYERS AND DETECTING SIGNAL OF WHICH THE LAYERS HAVE DIFFERENT MODULATION ORDERS IN MULTIPLE INPUT MULTIPLE OUTPUT ANTENNA SYSTEM AND RECEIVER USING THE SAME

(75) Inventors: Seungjae Bahng, Daejeon (KR); Junghyun Kim, Uijeongbu-si (KR); Youn Ok Park, Daejeon (KR)

(73) Assignees: Electronics and Telecommunications Research Institute, Daejeon (KR); Samsung Electronics Co., Ltd, Suwon-si (KR)

( * ) Notice: Subject to any disclaimer, the term of this patent is extended or adjusted under 35 U.S.C. 154(b) by 342 days.

(21) Appl. No.: 12/496,062

(22) Filed: Jul. 1, 2009

(65) Prior Publication Data
US 2010/0124301 A1    May 20, 2010

(30) Foreign Application Priority Data
Nov. 18, 2008  (KR) .................. 10-2008-0114870

(51) Int. Cl.
*H04K 1/10*   (2006.01)
*H04L 27/28*  (2006.01)
*H04L 27/00*  (2006.01)
(52) U.S. Cl. ......................... 375/260; 375/259
(58) Field of Classification Search ............... None
See application file for complete search history.

(56) References Cited

U.S. PATENT DOCUMENTS

| | | | |
|---|---|---|---|
| 5,991,308 A * | 11/1999 | Fuhrmann et al. | 370/395.53 |
| 7,193,538 B2 * | 3/2007 | Craven et al. | 341/50 |
| 7,664,191 B2 * | 2/2010 | Ho et al. | 375/267 |
| 2004/0192218 A1 * | 9/2004 | Oprea | 455/73 |
| 2005/0147183 A1 * | 7/2005 | Willink | 375/299 |
| 2006/0029149 A1 | 2/2006 | Kim et al. | |
| 2006/0140297 A1 * | 6/2006 | Maltsev et al. | 375/260 |
| 2007/0086539 A1 * | 4/2007 | Hocevar | 375/267 |
| 2007/0291868 A1 * | 12/2007 | Olesen et al. | 375/267 |

(Continued)

FOREIGN PATENT DOCUMENTS
KR    10-0808663 B1    2/2008

OTHER PUBLICATIONS

Jee Wong Kang et al., Simplified ML Detection Scheme for MIMO Systems, VTC, May 2004, pp. 823-827, vol. 2.

(Continued)

*Primary Examiner* — David C. Payne
*Assistant Examiner* — Erin File
(74) *Attorney, Agent, or Firm* — Jefferson IP Law, LLP (57) ABSTRACT

Disclosed are a method for re-ordering multiple layers and detecting signals and a receiver using the same to be able to exert performance approaching a maximum likelihood scheme while having lower complexity than that of the maximum likelihood scheme in a multiple input multiple output (MIMO) antenna system in a form where each layer is modulated and transmitted with different modulation orders.

7 Claims, 7 Drawing Sheets

U.S. PATENT DOCUMENTS

| | | | |
|---|---|---|---|
| 2008/0137782 A1* | 6/2008 | Bahng et al. | 375/341 |
| 2009/0135947 A1* | 5/2009 | Bahng et al. | 375/295 |
| 2010/0027703 A1* | 2/2010 | Yeh et al. | 375/267 |
| 2010/0067600 A1* | 3/2010 | Kim et al. | 375/267 |
| 2010/0098182 A1* | 4/2010 | Forck et al. | 375/261 |
| 2010/0183087 A1* | 7/2010 | Hosokawa et al. | 375/262 |
| 2010/0202573 A1* | 8/2010 | Su | 375/341 |
| 2011/0176628 A1* | 7/2011 | Rao et al. | 375/267 |

OTHER PUBLICATIONS

Jung-Hyun Kim et al., Detection Method for SM MIMO with Different Modulation Order, Mobile Packet Modem Research Team, Electronics and Telecommunications Research Institute, Wireless Communication and Digital Broadcasting Engineering, University of Science and Technology.

* cited by examiner

FIG. 7 ated with different modulation orders in a multiple input multiple output (MIMO) antenna system in a form where each layer is modulated and transmitted with different modulation orders.

US 8,116,396 B2

METHOD FOR RE-ORDERING MULTIPLE LAYERS AND DETECTING SIGNAL OF WHICH THE LAYERS HAVE DIFFERENT MODULATION ORDERS IN MULTIPLE INPUT MULTIPLE OUTPUT ANTENNA SYSTEM AND RECEIVER USING THE SAME

CROSS-REFERENCE TO RELATED APPLICATION

This application claims priority to and the benefit of Korean Patent Application No. 10-2008-0114870 filed in the Korean Intellectual Property Office on Nov. 18, 2008, the entire contents of which are incorporated herein by reference.

BACKGROUND OF THE INVENTION (a) Field of the Invention

The present invention relates to a method for re-ordering multiple layers and detecting signals of which the layers have different modulation orders in a multiple input multiple output antenna system and a receiver using the same. More particularly, the present invention relates to a method for re-ordering layers and detecting signals and a receiver using the same to be able to exert performance approaching a maximum likelihood scheme while having lower complexity than that of the maximum likelihood scheme in a multiple input multiple output (MIMO) antenna system in a form where each layer is modulated and transmitted with different modulation orders.

(b) Description of the Related Art

A wireless communication system of fourth-generation mobile communication needs a high-rate data service of images and packets in addition to an existing audio centered service. In order to meet the above requirement, a multiple input multiple output (MIMO) system using a spatial multiplexing scheme that can perform high-rate data transmission through multiple data stream (hereinafter, "stream" and "layer" have the same meanings) transmission is getting interesting.

In the MIMO system using the spatial multiplexing scheme, data layers each indicating different information are transmitted from each transmission antenna and in a receiving end, the transmitted data layers are separated. Herein, all the layers may be transmitted to a single user and each layer may be transmitted to multiple different users.

A maximum likelihood (ML) signal detecting mechanism, which is a mechanism that finds transmission signal vectors having ML metric values for each of possible combinations of transmission signal vectors in order to detect optimal transmission signals, has been known as the most excellent mechanism until now in view of performance detecting the transmission signals.

However, it is considered that the ML signal detecting mechanism in the related art cannot be substantially implemented since the complexity is exponentially increased as the number of transmission antennas and the number of constellation points are increased.

For this reason, a method for detecting signals such as a linear signal detecting method capable of lowering the complexity, for example, a zero forcing (ZF) scheme and a minimum mean square estimator (MMSE) scheme has been proposed. However, there is a problem in that these linear signal detecting mechanisms are significantly poor in view of performance as compared to the ML scheme.

Meanwhile, as a non-linear signal detecting mechanism, there is a signal detecting mechanism according to an ordered successive interference cancellation (OSIC) scheme that has been known as vertical bell lab layered space time (VBLAST)

Since the OSIC has low system complexity, it can be simply implemented as well as it is excellent in view of performance as compared to the linear signal detecting mechanisms such as ZF, MMSE, etc. However, the OSIC is still poor in view of performance as compared to the ML scheme.

Thereafter, as a signal detecting mechanism approaching the performance of the ML signal detecting mechanism while lowering the complexity of the system, a signal detecting mechanism according to a QR-LRL scheme was proposed.

The signal detecting mechanism according to the QR-LRL scheme re-orders the layers relating to a plurality of streams (e.g., four streams in the case of 4×4 MIMO system), thereby cancelling the interference between signals and detecting received signals.

At this time, the re-ordering of the layers is based on the magnitude of norm values of each column of a channel matrix corresponding to each layer. In other words, it is determined that the larger the norm values of the channel matrix corresponding to the layers, the lower the reliability of the layers becomes.

However, when the plurality of streams have different modulation orders, it is impossible to accurately determine the reliability of the layers only by simply comparing the norm values of the channel matrix corresponding to each layer Therefore, even when the layers modulated and transmitted with different modulation orders are received by the QR-LRL signal detection mechanism, a need exists for the method for re-ordering layers and detecting signals to be able to accurately determine the reliability of the layers and the receiver using the same The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method for re-ordering multiple layers and detecting signals and a receiver using the same having advantages of accurately determining the reliability of the layers even in the case of receiving the layers modulated and transmitted with different modulation orders in the multiple input multiple output antenna system.

An exemplary embodiment of the present invention provides a method for re-ordering multiple layers having different modulation orders in a receiver of a multiple input multiple output antenna system, including: estimating a first channel matrix for signals received through a plurality of receiving antennas; obtaining a second channel matrix by applying a weight value matrix to the first channel matrix; calculating an inverse matrix of the second channel matrix by using an inverse matrix of the second channel matrix; calculating norms of each row included in the inverse matrix; and obtaining a third channel matrix by re-ordering the plurality of layers according to the magnitude of the norms. Preferably, in the obtaining the second channel matrix, the weight value matrix is a diagonal matrix that has weight values allocated to each layer as main diagonal elements.

Preferably, in the re-ordering the multiple layers, a first layer corresponding to a row having the largest norm value of multiple layers is re-ordered in a bottom row of the third channel matrix, and the remaining layers other than the first layer of the multiple layers are sequentially re-ordered to be disposed in the bottom row of the third channel matrix as the magnitude of the norm values for each of the remaining layers is getting smaller.

Another embodiment of the present invention provides a method for detecting signals of multiple layers having different modulation orders in a receiver of a multiple input multiple output antenna system, including: performing channel estimation and layer re-ordering on signals received a plurality of receiving antennas by using a channel matrix to which weight values are applied; performing QR decomposition on a new channel matrix after performing the layer re-ordering; forming a group of candidate symbol vectors; and selecting as a final transmission signal a symbol vector having the smallest maximum likelihood metric value from the group of candidate symbol vectors.

Preferably, in the performing the channel estimation and the layer re-ordering, the channel matrix to which the weight value is applied is a second channel matrix obtained by applying a weight matrix to the estimated first channel matrix for signals received through the plurality of receiving antennas;

Yet another embodiment of the present invention provides a receiver of a multiple input multiple output antenna system, including: a plurality of receiving antennas that receive received signals; a channel estimation and layer ordering unit that performs channel estimation, channel weight value application, and layer re-ordering on the multiple layer of the received signals; a candidate group setting unit that determines a group of transmission symbol candidate vectors; and a final signal selector that selects as final signals a symbol vector having the smallest ML metric value among a group of predetermined symbol candidate vectors set in the candidate group setting unit;

With the present invention, even when the layers modulated and transmitted with different modulation orders are received by the QR-LRL signal detecting method, there are effects of approaching the performance to the ML scheme without increasing the complexity of the system.

The above information disclosed in this Background section is only for enhancement of understanding of the background of the invention and therefore it may contain information that does not form the prior art that is already known in this country to a person of ordinary skill in the art.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising", will be understood to imply the inclusion of stated elements but not the exclusion of any other elements. In addition, the terms "-er", "-or" and "module" described in the specification mean units for processing at least one function and operation and can be implemented by hardware components or software components and combinations thereof.

Figure 1:
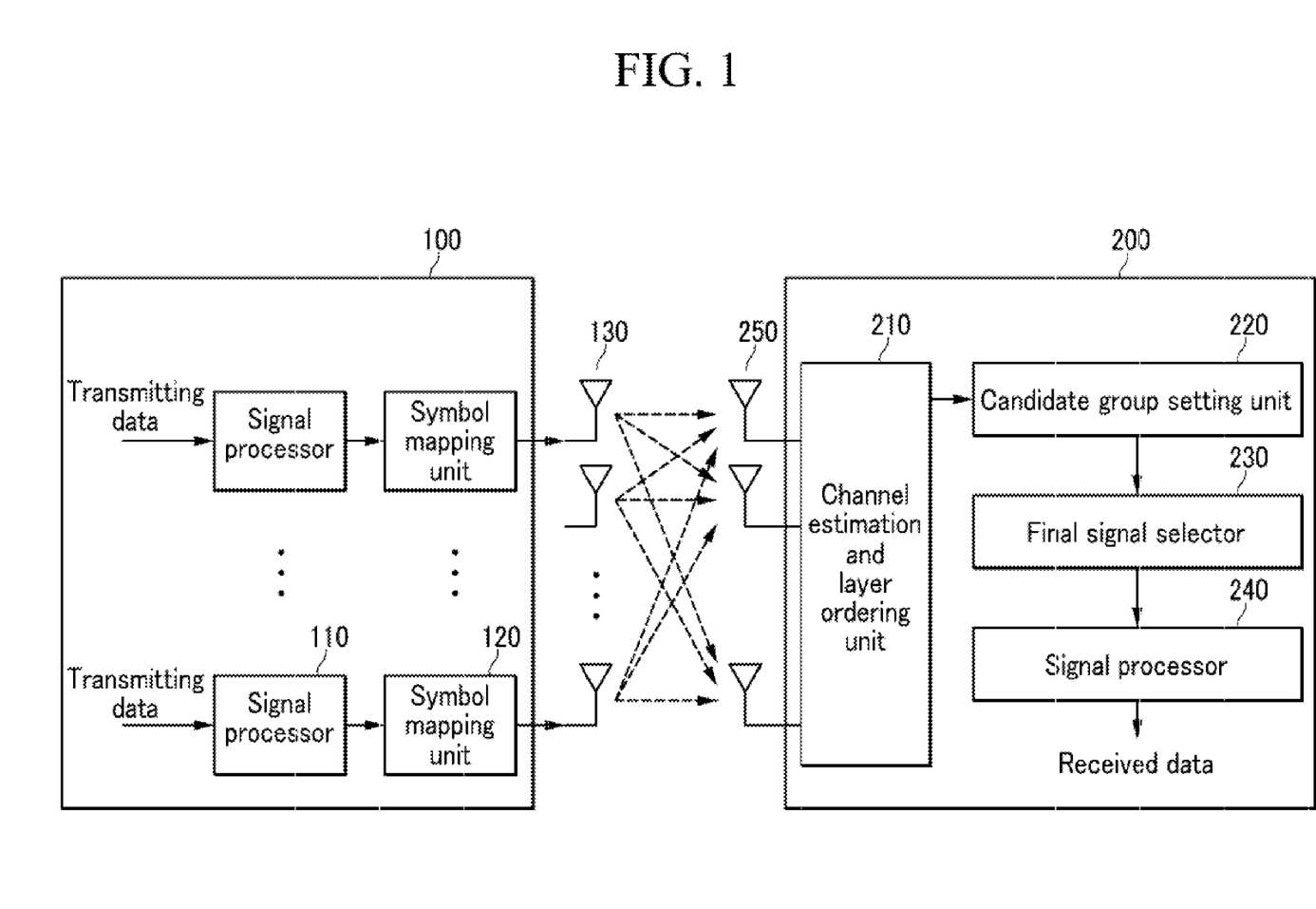
FIG. 1 is a configuration diagram showing a multiple input multiple output system according to an exemplary embodiment of the present invention.

FIG. 1 is a schematic diagram showing a multiple input multiple output system according to an exemplary embodiment of the present invention.

The multiple input multiple output system is configured to receive signals transmitted from a plurality of transmitting antennas through a plurality of receiving antenna via channels.

The exemplary embodiment of FIG. 1 relates to a four input four output system for convenience of explanation and thus, the transmitting antenna and the receiving antenna are four, respectively.

However, the range of the present invention is not limited to the four input four output system.

As shown in FIG. 1, the multiple input multiple output transmitting/receiving system is largely configured of a transmitting apparatus 100 and a receiving apparatus 200.

In the present exemplary embodiment, the transmitting apparatus 100 is configured to include four signal processors 110, four symbol mapping units 120, and four transmitting antennas 130.

In the signal processors 110, transmitting data allocated to each antenna are subjected to signal processes, such as scrambling, error correction coding, interleaving, etc., and then transmitted to the symbol mapping units 120.

The transmitting data transmitted to the signal processor 11 are binary data that are transmitted to a physical layer in a medium access control (MAC). Further, in the multiple user environment, the transmitting data allocated to each antenna may be signals that are transmitted to different users.

In the symbol mapping unit 120, the transmitting data are converted into symbols according to modulation schemes allocated to each layer. When the modulation schemes allocated to each layer are different, each layer may be modulated with different modulation orders.

After the layers are converted into symbol, they are simultaneously transmitted to the receiving apparatus 200 through each transmitting antenna 130.

The receiving apparatus 200 is configured to include four receiving antennas 250, a channel estimation and layer ordering unit 210, a candidate group setting unit 220, a final signal selector 230, and a signal processor 240.

The signals transmitted from the transmitting apparatus 100 are received in the receiving apparatus 200 in parallel through the receiving antenna 250.

In the channel estimation and layer ordering unit 210, the channel estimation and layer re-ordering are performed on the signals received in parallel through the receiving antenna 250.

At this time, when re-ordering the layers, the layer having the lowest reliability is ordered as a final layer and the remaining layers are ordered in a high layer order based on the layer having second lowest reliability.

In other words, when the layers are four, the layer having the lowest reliability is ordered as a final layer, the layer having the highest reliability is ordered as a third layer, the layer having second highest reliability is ordered as a second layer, and the layer having the third highest reliability is ordered as a first layer.

At this time, discrimination on the reliability of the layers is made based on signal-to-noise ratio (SNR) in consideration of the modulation orders allocate to each layer.

In the candidate group setting unit 220, a group of transmission symbol candidate vectors is determined from channel information received from a previous block and the re-ordered received signals.

In the final signal selector 230, the symbol vector having the smallest ML metric value of the group of symbol candidate vectors set in the candidate group setting unit 220 is selected as the final signal and at the same time, the signal of the layer allocated to the corresponding receiving apparatus is selected.

Finally, when an inverse function of the signal process performed in the signal processor 110 in the transmitting apparatus 100 is performed in the signal processor 240, the receiving data are finally obtained.

Figure 2:
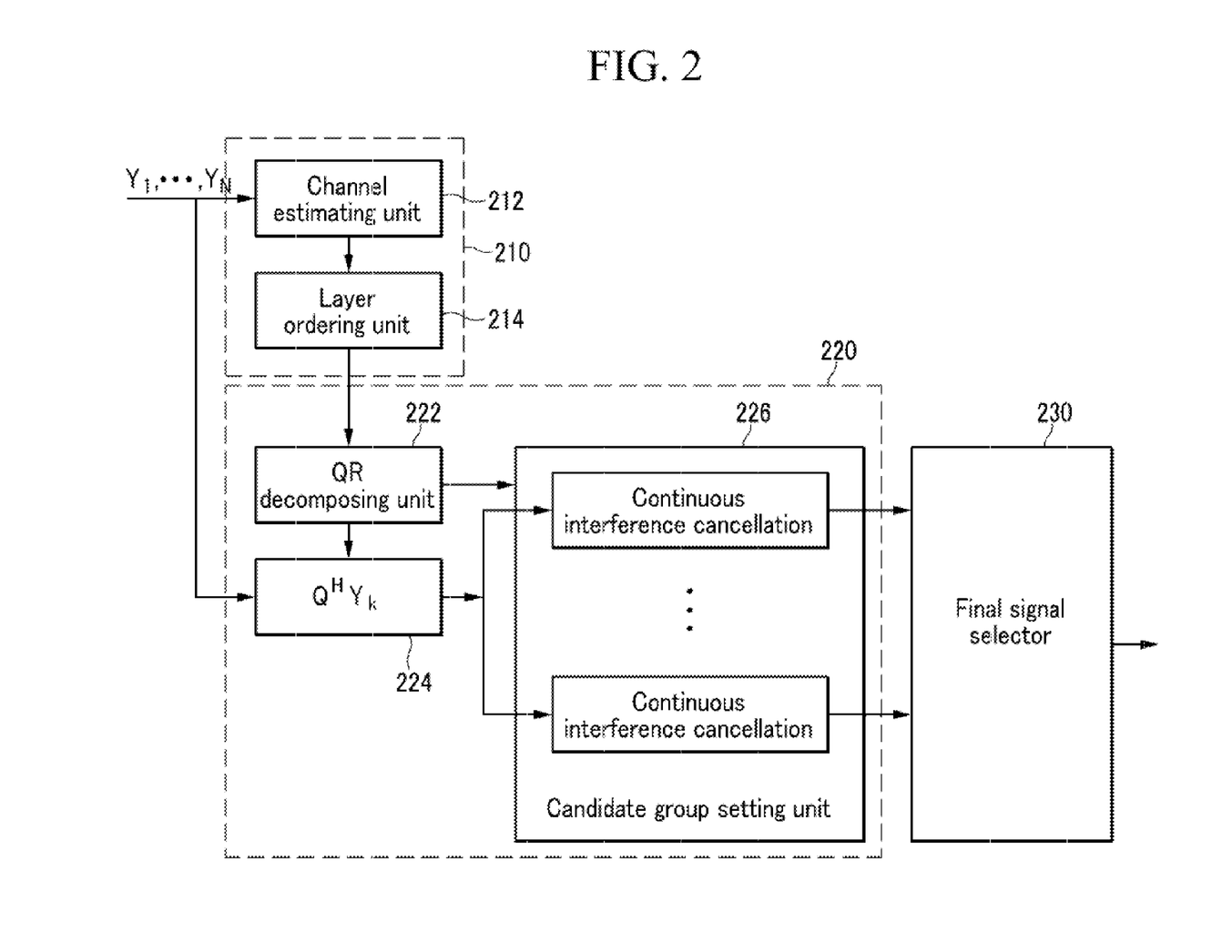
FIG. 2 is a diagram showing in more detail a channel estimation and layer ordering unit 210, a candidate group setting unit 220, and a final signal selector 230 of FIG. 1.

FIG. 2 is a diagram showing in more detail the channel estimation and layer ordering unit 210, the candidate group setting unit 220, and the final signal selector 230 of FIG. 1

As shown in FIG. 2, the signals received in the receiving apparatus 200 are transmitted to the channel estimation and layer ordering unit 210 from the receiving antenna 260.

The channel estimating unit 212 estimates the distortion of signals caused due to multipath fading of the MIMO channel and the layer ordering unit 214 re-orders the layers through the channel matrix to which weight values are allocated in consideration of the modulation orders to which each layer is applied.

Assuming that $\hat{H}$ is the MIMO channel before the re-ordering, as in Equation 1, the weight value matrix according to the modulation orders of each layer is multiplied by a right of the MIMO channel matrix before the re-ordering, making it possible to obtain a new channel matrix $$\tilde{H} = \hat{H}W \qquad \text{[Equation 1]}$$

Where the weight value matrix W may be defined by Equation 2.

$$W = \begin{bmatrix} w_1 & 0 & 0 & 0 \\ 0 & w_2 & 0 & 0 \\ 0 & 0 & w_3 & 0 \\ 0 & 0 & 0 & w_4 \end{bmatrix} \qquad \text{[Equation 2]}$$

The weight values (n=1, 2, 3, 4) allocated to each layer are defined by Equation 3 according to the modulation orders allocated to each layer.

$$w_n = \sqrt{\frac{3\log_2 U \cdot E_b}{U^2 - 1}} \qquad \text{[Equation 3]}$$

where U represents U×U square quadrature amplitude modulation (QAM) orders.

For example, when the layer is modulated with 16-QAM, it is equal to 4 and when the weight value corresponding thereto is $E_s=1(E_b=1/4)$, it is equal to $1/\sqrt{10}$. $E_s$ represents energy of a symbol, and $E_b$ represents energy of bits.

The weight values corresponding to several square quadrature amplitude modulation (QAM) that has been mainly used are exemplified in Table 1.

TABLE 1

| Modulation scheme | $W_n$ |
| --- | --- |
| QPSK (Quadrature Phase-Shift Keying) | $1/\sqrt{2}$ |
| 16-QAM | $1/\sqrt{10}$ |
| 64-QAM | $1/\sqrt{42}$ |

Further, a matrix G can be obtained as in Equation 4 by the inverse matrix calculation with a new matrix that is multiplied by the weight value matrix calculated according to the modulation orders allocated to each layer.

$$G = \tilde{H}^{-1} \qquad \text{[Equation 4]}$$

Herein, a layer $x_4$ having the largest value, a layer $x_3$ having the smallest value, a layer $x_2$ having the second smallest value, and a layer $x_1$ having a third smallest value are sequentially ordered by obtaining the norms of each row of the matrix G.

They system model after the re-ordering is represented by Equation 5.

Where, $\tilde{y}=[\tilde{y}_1\ \tilde{y}_2\ \tilde{y}_3\ \tilde{y}_4]^T$ is the received signal, $x=[x_1\ x_2\ x_3\ x_4]^T$ is the re-ordered transmitting signal, $\tilde{n}=[\tilde{n}_1\ \tilde{n}_2\ \tilde{n}_3\ \tilde{n}_4]^T$ is noise, and $\tilde{H}=[h_1\ h_2\ h_3\ h_4]^T$ is a 4×4 estimated channel matrix after the re-ordering. [Equation 5]

Therefore, $x_4$ is a symbol of the layer having the lowest reliability, $x_3$ is a symbol of the layer having the highest reliability, $x_2$ is a symbol of the layer having the second highest reliability, and $x_1$ is a symbol of the layer having the third highest reliability.

As such, the reason of re-ordering the layers in the layer ordering unit is to enumerate and consider all possible constellation points for the most non-reliable layer, that is, $x_4$ when detecting the candidate symbol vectors in the candidate group setting unit 220.

In the QR decomposition unit 220 of the candidate group setting unit 220, the re-ordered channel matrix H is subjected to QR decomposition as in Equation 6.

$$H = QR \qquad \text{[Equation 6]}$$

$$= Q \begin{bmatrix} r_{11} & r_{12} & r_{13} & r_{14} \\ 0 & r_{22} & r_{23} & r_{24} \\ 0 & 0 & r_{33} & r_{34} \\ 0 & 0 & 0 & r_{44} \end{bmatrix}$$

Where Q is an orthogonal matrix and R is an upper triangular matrix having only the upper portion, including the diagonal component.

If the signal is y after applying matrix $Q^H$ to received signal, then y is represented by Equation 7.

$$y = Q^H \tilde{y} \qquad \text{[Equation 7]}$$

In the candidate group setting unit 220, $x_4$, which is the symbol of the most non-reliable layer, is obtained by considering a case of all the constellation points (224). On the other hand, the symbol detection for the layers other than $x_4$ is continuously performed from R through the characteristics of the matrix (226).

For example, $x_3$ is obtained by Equation 8. Herein, the slicing is an operation mapping to the nearest constellation point.

$$x_3 = \text{slicing}\left(\frac{y_3 - r_{34}x_4}{r_{33}}\right) \qquad \text{[Equation 8]}$$

Further, $x_2$, $x_1$ are obtained by Equation 9 and Equation 10.

$$x_2 = \text{slicing}\left(\frac{y_2 - r_{23}x_3 - r_{24}x_4}{r_{22}}\right) \qquad \text{[Equation 9]}$$

$$x_1 = \text{slicing}\left(\frac{y_1 - r_{12}x_2 - r_{13}x_3 - r_{14}x_4}{r_{11}}\right) \qquad \text{[Equation 10]}$$

If the above operations are applied to all the constellation points of $x_4$, the symbol vectors corresponding to the number (C) is finally obtained.

When the group of C symbol vectors is B, B is defined by Equation 11.

$$B = \{\hat{x}(l)\}, \ 1 \leq l \leq C \qquad \text{[Equation 11]}$$

In the final signal selector 230, the symbol vector having the smallest ML metric value is selected from the group B of candidate symbol vectors and the symbols allocated to the corresponding receiving apparatus are selected from the symbol vectors and are subjected to the reverse process of the symbol mapping.

Figure 3:
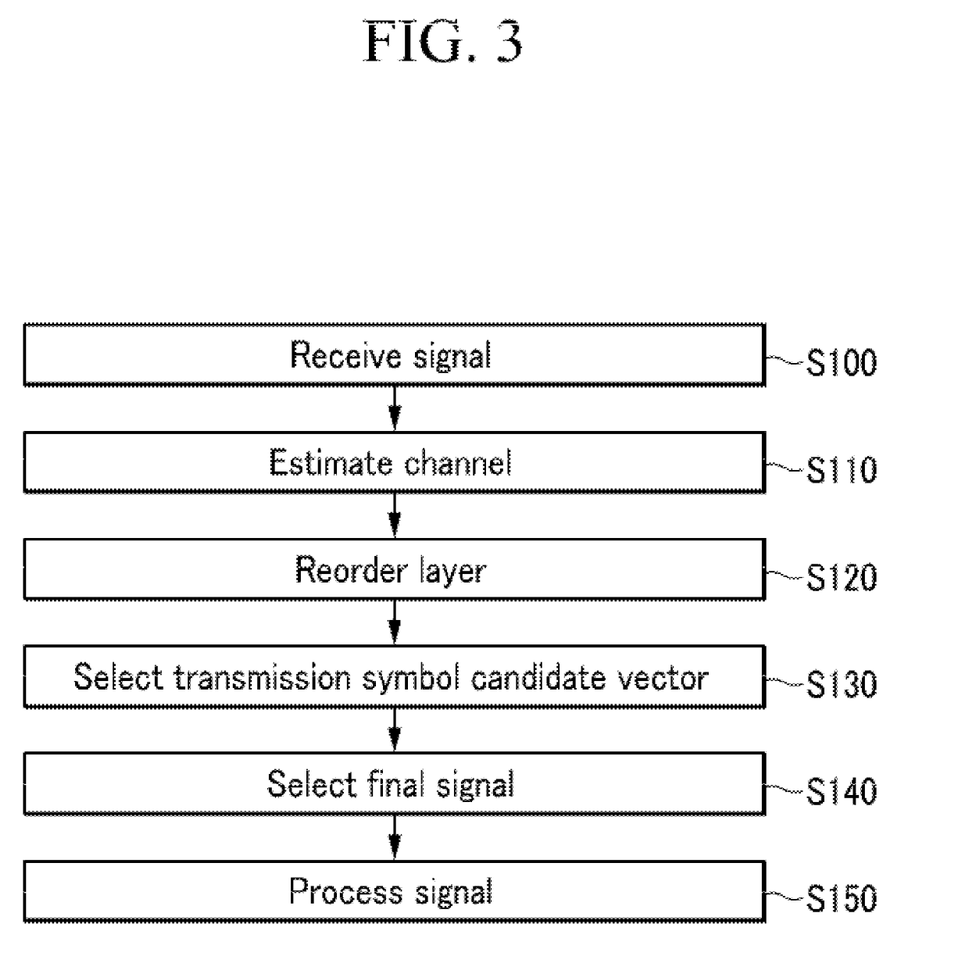
FIG. 3 is a flow chart showing a method for detecting signals according to an exemplary embodiment of the present invention.

FIG. 3 is a flow chart showing a flow of a method for detecting signals according to an exemplary embodiment of the present invention.

As shown in FIG. 3, the method for detecting signals in the receiving apparatus of the multiple input multiple output receiving antenna system includes receiving the signals (S100), estimating channels (S110), re-ordering layers (S120), selecting transmission symbol candidate vectors (S130), selecting final signals (S140), and processing the signals (S150).

In the receiving the signals (S100), the signals from the transmitting apparatus are received through a plurality of receiving antennas in the receiving apparatus.

In the estimating the channels (S110), the estimation of the channel is performed on the received signals by using the channel matrix to which the weight values are applied.

In the re-ordering the layers (S120), after the weight value matrix is applied to the channel matrix obtained in the estimating the channel (S110), the re-ordering of the layers is performed.

In the selecting the transmission symbol candidate vectors (S130), QR decomposition is performed on a new channel matrix after the re-ordering of the layers is performed, thereby forming the group of candidate symbol vectors.

In the selecting the final signal (S140), the symbol vector having the smallest maximum likelihood metric value from the group of candidate symbol vectors is as the final transmitting signals and symbols allocated to the corresponding receiving apparatus are selected from the symbol vectors and are subjected to a reverse process of the symbol mapping.

Figure 4:
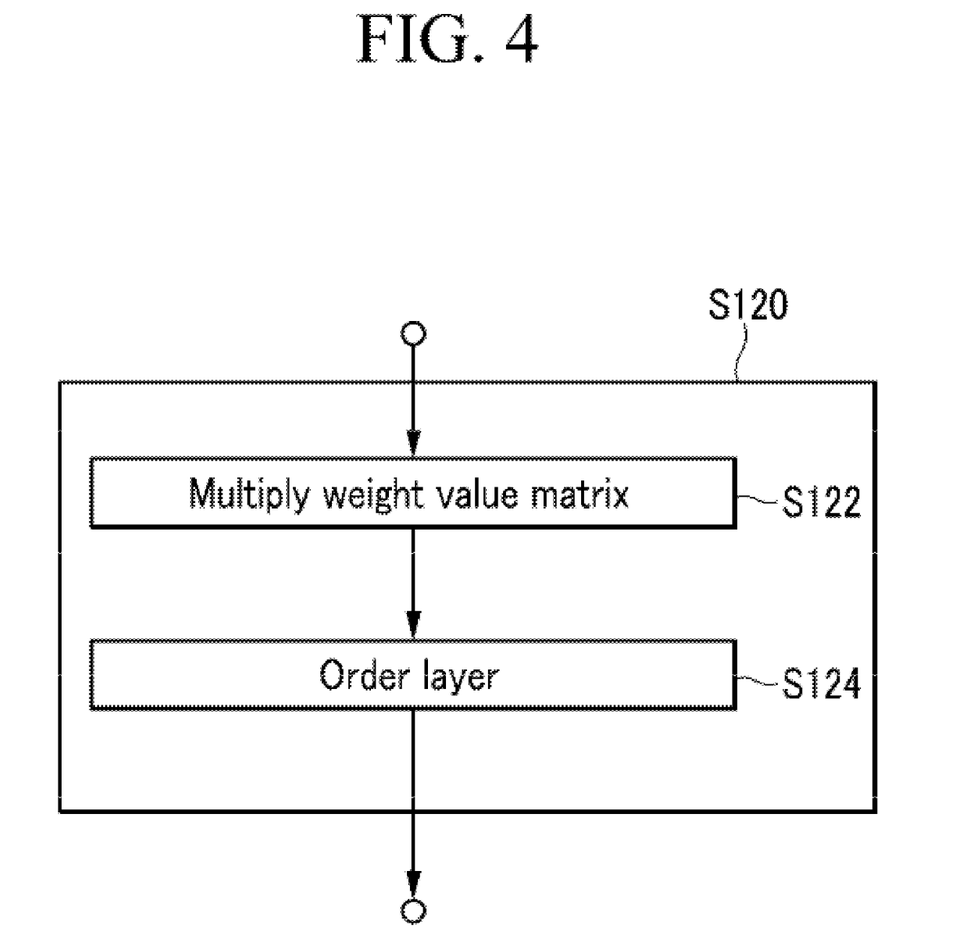
FIG. 4 is a flow chart showing in more detail the re-ordering the layers of FIG. 3.

FIG. 4 is a flow chart showing in more detail the re-ordering the layers of FIG. 3.

As shown in FIG. 4, the re-ordering the layers of FIG. 3 (S120) may be divided into multiplying the weight value matrix (S122) and ordering the layers (S124).

As described above, the multiplying the weight value matrix (S122) multiplies the channel matrix ($\tilde{H}$) obtained in the channel estimation by the weigh value matrix having the weight value defined according to the modulation layers of each layer as a main element, thereby obtaining a new channel matrix ( ).

Next, the ordering the layers (S124) obtains norm values of each row of an inverse matrix ($G = \hat{H}^{-1}$) to the channel matrix ( ) before the re-ordering, such that the layer corresponding to a row having the largest norm value among the plurality of layers, that is, the layer having the lowest reliability is re-ordered in a bottom row of the channel matrix after the re-ordering and the remaining layers other than the layer are sequentially re-ordered from a top row of the layer having the lowest reliability in order of small norm values, that is, in order of high reliability.

Figure 5:
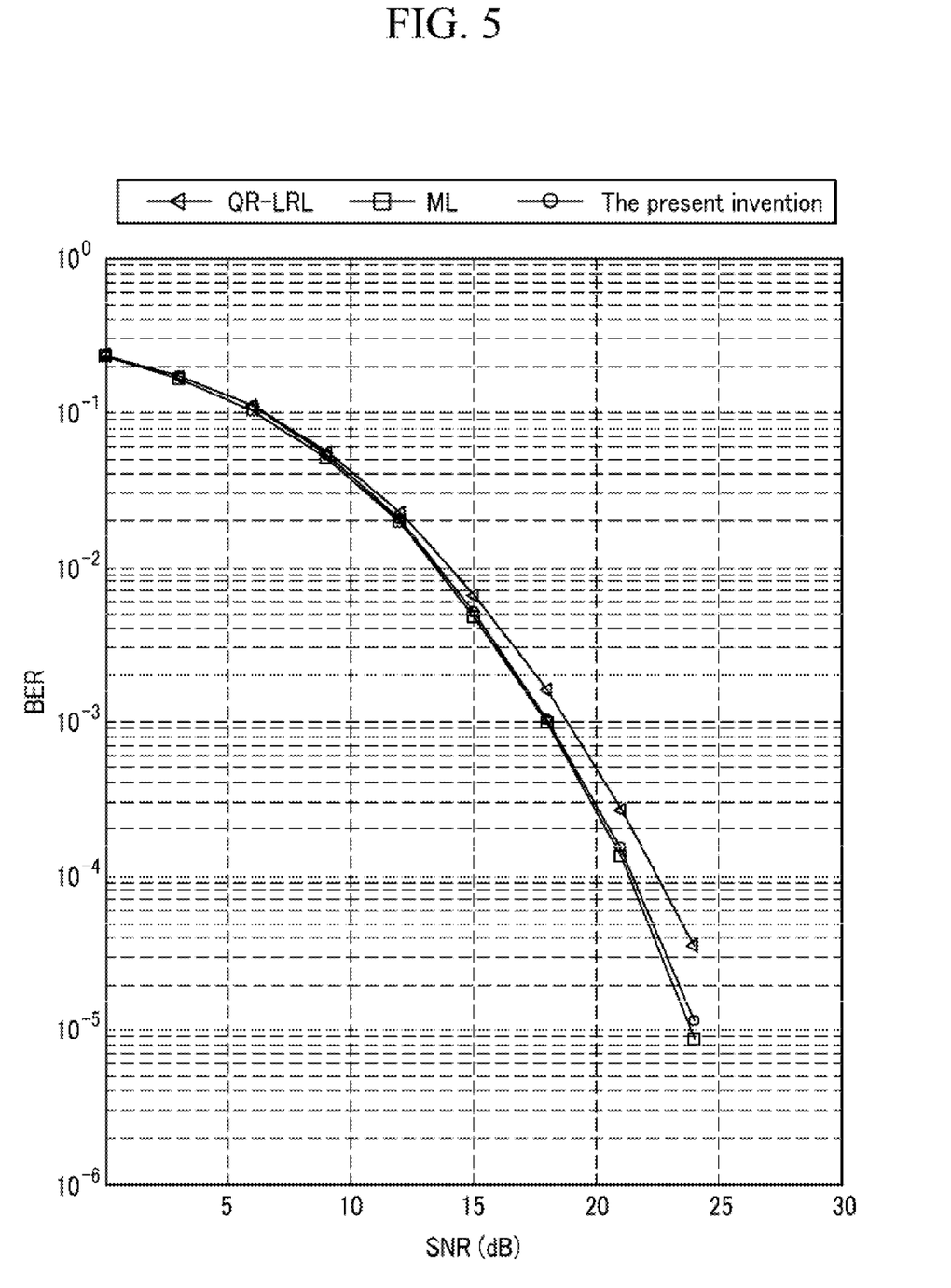
FIG. 5 is a graph comparing a bit error rate between the method for detecting signals according to the present invention, a maximum likelihood method, and a general QR-LRL method when layers are modulated with QPSK in four input four output antenna system.
Figure 6:
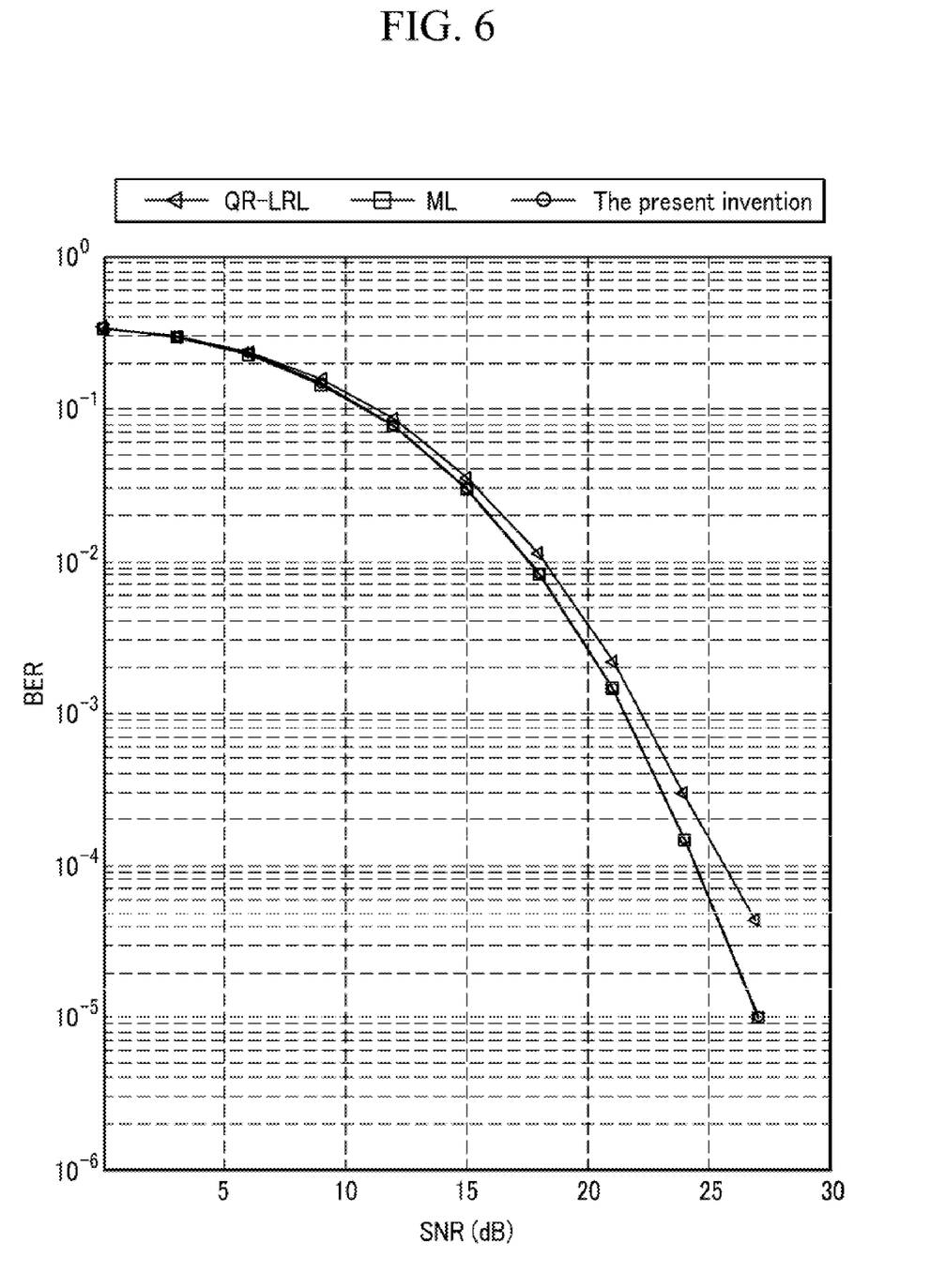
FIG. 6 is a graph comparing a bit error rate between the method for detecting signals according to the present invention, a maximum likelihood method, and a general QR-LRL method when layers are modulated with 16-QAM in four input four output antenna system.
Figure 7:
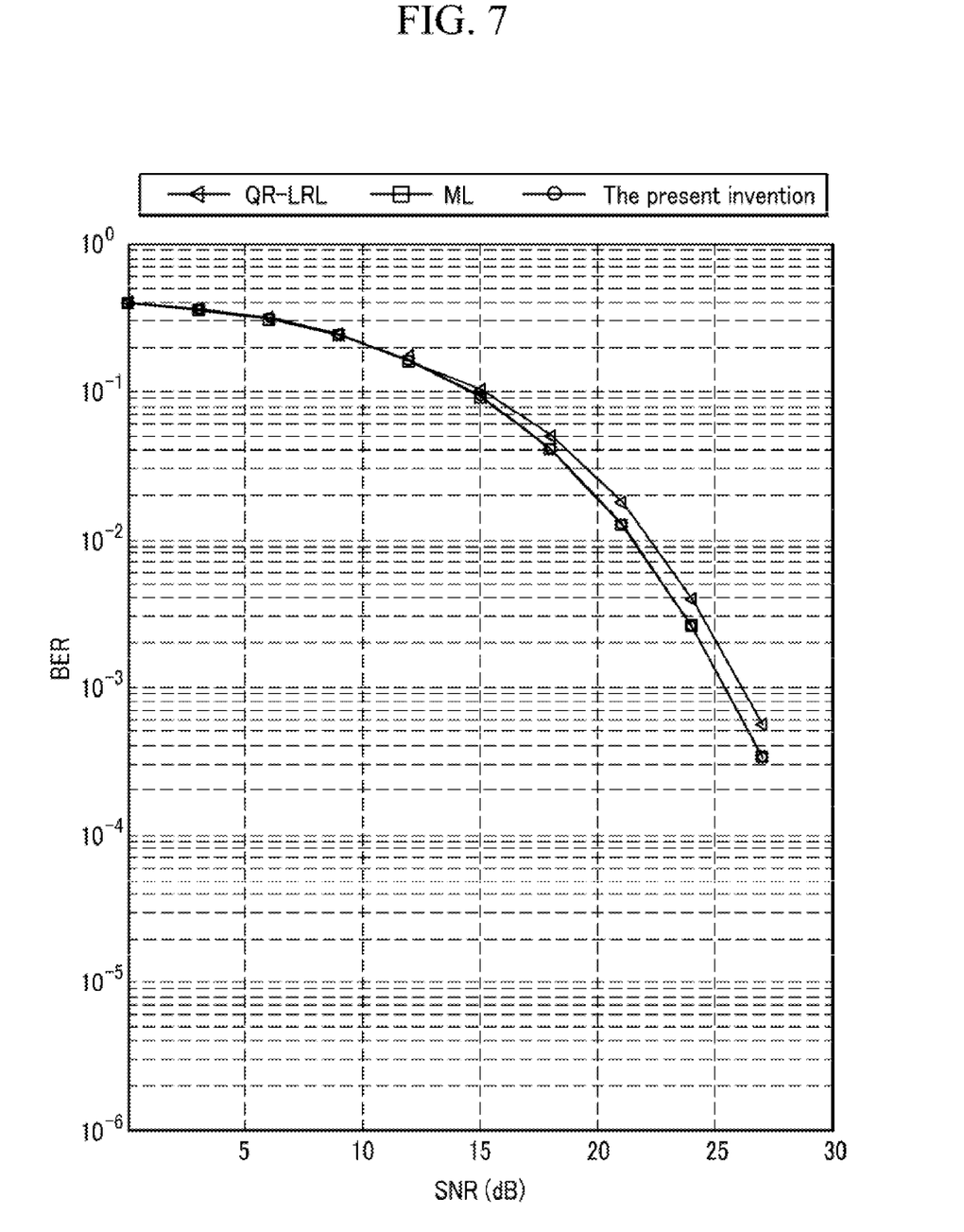
FIG. 7 is a graph comparing a bit error rate between the method for detecting signals according to the present invention, a maximum likelihood method, and a general QR-LRL method when layers are modulated with 64-QAM in four input four output antenna system.

FIG. 5 is a graph comparing a bit error rate between the method for detecting signals according to the present invention, a maximum likelihood method, and a general QR-LRL method when the layers are modulated with QPSK in the four input four output antenna system, FIG. 6 is a graph comparing a bit error rate between the method for detecting signals according to the present invention, a maximum likelihood method, and a general QR-LRL method when the layers are modulated with 16-QAM in four input four output antenna system, and FIG. 7 is a graph comparing a bit error rate between the method for detecting signals according to the present invention, a maximum likelihood method, and a general QR-LRL method when the layers are modulated with 64-QAM in four input four output antenna system Referring to FIGS. 5 to 7, in the four input four output antenna system, $x_1$ is modulated with QPSK, $x_2$ . . . $x_3$ are modulated with 16-QAM, and $x_4$ is modulated with 64-QAM.

As can appreciated from the drawings, the graph in the case of using the method for detecting signals according to the present invention approximately meets the graph of the maximum likelihood (ML) method that has been known as exerting the optimal performance.

It can be confirmed from the drawings facts that the method for detecting signals according to the present invention approaches the performance of the maximum likelihood method and has a gain at higher SNR than the QR-LRL method without the weight value matrix.

The exemplary embodiments of the present invention as described above are implemented not only the method and apparatus, but programs that achieve functions corresponding to the configuration of the exemplary embodiments of the present invention or recording mediums including the programs. This can be easily implemented from the foregoing exemplary embodiments by those skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for re-ordering multiple layers having different modulation orders in a receiver of a multiple input multiple output antenna system, comprising:
    estimating a first channel matrix for signals received through a plurality of receiving antennas;
    obtaining a second channel matrix by applying a weight value matrix to the first channel matrix;
    calculating an inverse matrix of the second channel matrix by using an inverse matrix of the second channel matrix;
    calculating norms of each row included in the inverse matrix; and
    obtaining a third channel matrix by re-ordering the plurality of layers according to the magnitude of the norms,
    wherein, in obtaining the second channel matrix, the weight value matrix is a diagonal matrix that has weight values allocated to each layer as main diagonal elements, and
    wherein, the weight values are differently defined for each modulation order allocated to the layers.

2. The method for re-ordering multiple layers of claim 1, wherein each of the weight values is defined by the following Equation according to the modulation orders:

$$w_n = \sqrt{\frac{3\log_2 U \cdot E_b}{U^2 - 1}}.$$

where U represents U×U square quadrature amplitude modulation (QAM) orders.

3. The method for re-ordering multiple layers of claim 2, wherein, the obtaining of the second channel matrix multiplies the weight value matrix by the first channel matrix.

4. The method for re-ordering multiple layers of claim 3, wherein, the re-ordering the multiple layers re-orders a first layer corresponding to a row having the largest norm value of multiple layers in a bottom row of the third channel matrix, and sequentially re-orders the remaining layers other than the first layer of the multiple layers as the magnitude of the norm values for each of the remaining layers is getting smaller.

5. A method for detecting signals of multiple layers having different modulation orders in a receiver of a multiple input multiple output antenna system, comprising:
    performing channel estimation and layer re-ordering on signals received through a plurality of receiving antennas by using a channel matrix to which weight values are applied;
    performing QR decomposition on a new channel matrix after performing the layer re-ordering;
    forming a group of candidate symbol vectors; and
    selecting as a final transmission signal a symbol vector having the smallest maximum likelihood metric value from the group of candidate symbol vectors,
    wherein the weight value matrix is a diagonal matrix that has weight values allocated to each layer as main diagonal elements, and
    wherein, the weight values are differently determined according to the modulation orders of the layers.

6. The method for detecting signals of claim 5, wherein, the channel matrix to which the weight value is applied is a second channel matrix obtained by applying a weight matrix to the estimated first channel matrix for signals received through the plurality of receiving antennas.

7. A receiver of a multiple input multiple output antenna system, comprising:
    a plurality of receiving antennas that receive received signals;
    a channel estimation and layer ordering unit that performs channel estimation, channel weight value application, and layer re-ordering on the multiple layer of the received signals;
    a candidate group setting unit that determines a group of transmission symbol candidate vectors; and
    a final signal selector that selects as final signals a symbol vector having the smallest ML(maximum likelihood) metric value among a group of predetermined symbol candidate vectors set in the candidate group setting unit,
    wherein channel weight values are differently applied for each modulation order owned by multiple layers.

* * * * *